United States Patent
Xu et al.

(10) Patent No.: US 11,738,284 B2
(45) Date of Patent: Aug. 29, 2023

(54) DISTILLATION TRAYS

(71) Applicant: UOP LLC, Des Plaines, IL (US)

(72) Inventors: Zhanping Xu, Inverness, IL (US); Brian J. Nowak, Orchard Park, NY (US)

(73) Assignee: UOP LLC, Des Plaines, IL (US)

( * ) Notice: Subject to any disclaimer, the term of this patent is extended or adjusted under 35 U.S.C. 154(b) by 43 days.

(21) Appl. No.: 17/646,189

(22) Filed: Dec. 28, 2021

(65) Prior Publication Data

US 2022/0331709 A1  Oct. 20, 2022

Related U.S. Application Data

(60) Provisional application No. 63/175,662, filed on Apr. 16, 2021.

(51) Int. Cl.
*B01D 3/18* (2006.01)
*B01D 3/32* (2006.01)

(52) U.S. Cl.
CPC .............. *B01D 3/324* (2013.01); *B01D 3/18* (2013.01)

(58) Field of Classification Search
CPC .................................. B01D 3/18; B01D 3/324
USPC ............................................. 261/114.1, 114.5
See application file for complete search history.

(56) References Cited

U.S. PATENT DOCUMENTS

| | | |
|---|---|---|
| 3,632,315 A | 1/1972 | Uitti |
| 3,700,216 A | 10/1972 | Uitti et al. |
| 4,550,000 A | 10/1985 | Bentham |
| 4,956,127 A | 9/1990 | Binkley et al. |
| 5,098,615 A | 3/1992 | Resetarits |
| 5,106,556 A | 4/1992 | Binkley et al. |
| 5,164,125 A | 11/1992 | Binkley et al. |
| 5,192,466 A | 3/1993 | Binkley |
| 5,262,094 A | 11/1993 | Chuang |
| 5,277,848 A | 1/1994 | Binkley et al. |
| 5,382,390 A | 1/1995 | Resetarits et al. |
| 5,407,605 A | 4/1995 | Resetarits et al. |
| 5,480,595 A | 1/1996 | Yeoman et al. |
| 5,547,617 A | 8/1996 | Lee et al. |
| 6,189,872 B1 | 2/2001 | Chuang |
| 6,715,741 B2 * | 4/2004 | Xu .......................... B01D 3/20 261/114.5 |
| 6,736,378 B2 | 5/2004 | Colic et al. |
| 6,799,752 B2 | 10/2004 | Wu et al. |

(Continued)

FOREIGN PATENT DOCUMENTS

| | | |
|---|---|---|
| WO | 02102488 A1 | 12/2002 |
| WO | 2010008963 A2 | 1/2010 |

OTHER PUBLICATIONS

International Search Report from corresponding PCT application No. PCT/US2022/071690, dated Aug. 1, 2022.

(Continued)

*Primary Examiner* — Charles S Bushey (57) ABSTRACT

Distillation trays having improved efficiency and capacity are described. The improvement is accomplished with unique downcomer spout arrangements and bubble promoters which provide equal liquid distribution to all areas of the tray. The ratio of the open area of a contacting zone including part of a bubble promoter and associated deck zone over the open area of the downcomer spout zone on the adjacent tray for distributing liquid to the zone is essentially the same across the tray.

20 Claims, 8 Drawing Sheets

(56) References Cited

U.S. PATENT DOCUMENTS

| | | | |
|---|---|---|---|
| 7,125,005 B2* | 10/2006 | Colic | B01D 3/22 |
| | | | 261/114.5 |
| 8,136,799 B2 | 3/2012 | Griepsma | |
| 8,833,742 B2 | 9/2014 | Xu et al. | |
| 11,148,069 B2 | 10/2021 | Xu et al. | |
| 11,554,328 B2* | 1/2023 | Nowak | B01D 3/163 |
| 2002/0163091 A1 | 11/2002 | Wu et al. | |
| 2003/0067085 A1* | 4/2003 | Shakur | B01D 3/32 |
| | | | 261/100 |
| 2005/0218534 A1 | 10/2005 | Colic et al. | |
| 2007/0137482 A1 | 6/2007 | Xu et al. | |
| 2011/0305616 A1 | 12/2011 | Xu | |

OTHER PUBLICATIONS

Written Opinion from corresponding PCT application No. PCT/US2022/071690, dated Aug. 1, 2022.

\* cited by examiner

Prior Art

DISTILLATION TRAYS

RELATED APPLICATIONS

This application claims priority to U.S. Provisional Patent Application Ser. No. 63/175,662 filed on Apr. 16, 2021, the entirety of which is incorporated herein by reference.

BACKGROUND

Multiple downcomer trays are widely used in distillation columns for the separation of light hydrocarbons, such as propane-propylene and ethane-ethylene, due to their high capacity and ease of scale-up.

Figure 1A:
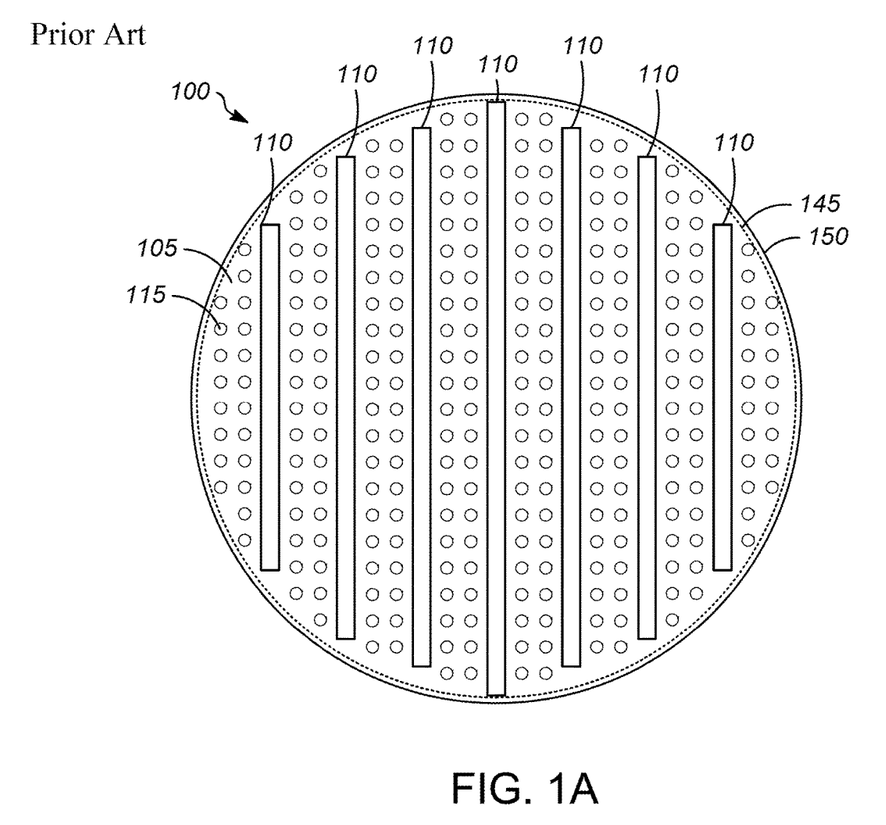
FIGS. 1A and 1B illustrate an existing design for a multiple downcomer tray.
Figure 1B:
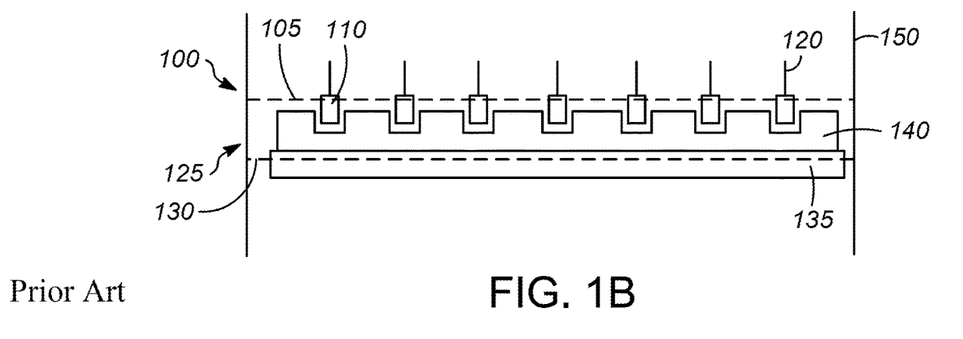

FIGS. 1A-1B show an existing design of a multiple downcomer tray 100. It is composed of deck 105 and terminated downcomers 110. The deck 105 has perforations 115. FIG. 1B illustrates two trays 100 and 125. Downcomers 110 extend across the column cross section and are supported by ring 145. The top of downcomer 110 is open for receiving liquid from deck 105 and the bottom of the downcomer 110 has openings for discharging liquid to a lower tray 125. The ring 145 is attached to column wall 150. The deck 105 is supported by the downcomers 110 and the ring 145. The downcomers 135 for tray 125 are offset by 90 degrees from the downcomers 110 of tray 100. There are anti jumping baffles 120 above the downcomers 110 for tray 100 (not shown in FIG. 1A). Tray 125 has a deck 130 with downcomer 135 and anti jumping baffles 140.

The active area for vapor-liquid contacting on tray 100 is approximately 70-90% of the column cross-sectional area. The rest of the column cross-sectional area is blocked by the downcomers 110, tray support ring 145 and deck supports on the sides of downcomers (not shown). In addition, those tray zones for receiving liquid on lower tray 125 under the downcomers 110 for the upper tray 100 are not as active as those tray zones away from the downcomers 110 due to higher liquid head there and less vapor to pass through.

The current multiple downcomer trays have a number of advantages. The long downcomer weir length provides the ability to handle high liquid loads. The 90-degree rotation of the downcomers between adjacent trays permits the use of trays in large columns without large-scale mal-distribution of liquid. The terminated downcomers provide large free space for vapor-liquid flow, contact and separation.

However, it would be desirable to have a tray with a higher capacity than existing multiple downcomer trays to increase throughput in existing columns.

DESCRIPTION

The capacity of the current multiple downcomer tray has been increased by expanding the tray active area for vapor-liquid flow, contact, and separation, as described in U.S. application Ser. No. 16/707,029, entitled Multiple Downcomer Trays, filed Dec. 9, 2019, now U.S. Pat. No. 11,148,069, which is incorporated herein by reference in its entirety. The increased active area of the tray has been achieved by adding raised bubble promoters on the tray deck which are located under the downcomers from the tray above. With the raised bubble promoters, the tray active area can be increased by about 10% to 30%. In addition, the zones under the downcomer from the tray above become more active due to reduced liquid head there.

Adding the bubble promoter on the tray deck also increases the efficiency of the tray. The bubble promoter promote uniform vapor and liquid flow and contact across the deck.

In order to further increase tray efficiency and capacity, the amount of liquid distributed to each of the contacting zones should be proportional to the open areas for vapor flow in the contacting zone. This has been accomplished by a unique downcomer spouting arrangement in conjunction with the bubble promoters.

To distribute the liquid in proportion to the open area of each of the contacting zones, the downcomers have at least one first spout zone on one side of the bottom of the downcomer and at least one second spout zone on the other side of the bottom of the downcomer. The open area of each of the spout zones is proportional to the open area of a corresponding contacting zone on the deck of the adjacent tray. A common example of a situation where a problem may arise is when the bubble promoter is next to the edge of the tray. In this case, the area on the deck adjacent to one side of the bubble promoter can be different from the area of the deck on the other side of the bubble promoter. The open area of the corresponding spout zone of the adjacent tray can be designed to account for the difference by providing an appropriate open area for that spout zone.

For trays with more than two downcomers, all of the bubble promoters with one side adjacent to the column wall rather than another bubble promoter are likely to have different open areas in the contacting zones on the two sides of the bubble promoters. Therefore, the spout zones on the two sides of the downcomers on the adjacent tray aligned with those bubble promoters will have different open areas such that the ratio of the open areas of the contacting zones on two sides of the bubble promoters is essentially the same as the ratio of the respective open areas of the spout zones on two sides of the downcomers above.

For the bubble promoters in the middle, the deck areas on the two sides of each bubble promoters are the same, so the open areas of the spout zones on two sides of the adjacent downcomers are the same.

Therefore, the ratio of the open area of a contacting zone including one side of a bubble promoter and associated deck over the open area of the downcomer spout zone on the adjacent tray aligned with the side of the bubble promoter for distributing liquid to the contacting zone is essentially the same across the tray.

One aspect of the invention is a tray. In one embodiment, the tray comprises: a perforated deck; a plurality of parallel trough-shaped downcomers extending through the deck, each downcomer having at least one first spout zone on a first side of a bottom and at least one second spout zone on a second side of the bottom; a plurality of perforated bubble promoters on the deck, each bubble promoter having a first side and a second side, the bubble promoters positioned to align with at least one first spout zone and at least one second spout zone on a plurality of parallel trough-shaped downcomers on an adjacent tray rotated 90 degrees from the tray; an open area of the at least one first spout zone on the adjacent tray being proportional to an open area of a first contacting zone of the tray, the first contacting zone defined by the first side of the bubble promoter and an associated deck zone; an open area of the at least one second spout zone on the adjacent tray being proportional to an open area of a second contacting zone of the tray, the second contacting zone defined by the second side of the bubble promoter and an associated deck zone; and wherein a ratio of the open area of the first spout zone to the open area of the second spout zone of the adjacent tray is 0.95 to 1.05 times a ratio of the open area of the first contacting zone to the open area of the second contacting zone of the tray.

The associated deck zone depends on where the bubble promoter is located on the deck. Each of the associated deck zones is extended either from the edge of one side of the bubble promoter to the edge of the deck or from the edge of one side of the bubble promoter to the midpoint between two adjacent bubble promoters in length and between two adjacent downcomers or between a downcomer and edge of the deck in width.

In some embodiments, the bubble promoters have an inverted V-shape with vertical ends.

In some embodiments, a length of the spout zones on the first tray is less than a length of the bubble promoters on the tray below, or a width of the spout zones on the first tray is less than a width of the bubble promoters on the tray below, or both.

In some embodiments, a size of the perforations of the deck is different from a size of the perforations of the bubble promoters.

In some embodiments, a pitch of the perforations of the deck is different from a pitch of the perforations of the bubble promoters.

In some embodiments, a size of the perforations of the first spout zone is different from a size of the perforations of the second spout zone.

In some embodiments, a shape of the perforations of the first spout zone is different from a shape of the perforations of the second spout zone.

In some embodiments, an open area of the deck is in a range of 5 to 30% of a total area of the deck, or wherein an open area of one of the bubble promoters is in a range of 5 to 30% of a total area of the one bubble promoter, or both.

Another aspect of the invention is a pair of trays. In one embodiment, the pair of trays comprises: the first tray comprising: a perforated deck; a plurality of parallel trough-shaped downcomers extending through the deck, each downcomer having a first spout zone on a first side of a bottom and a second spout zone on a second side of the bottom, and wherein there is a downcomer at an edge of the first tray; a plurality of perforated bubble promoters on the deck, each bubble promoter having a first side and a second side, the bubble promoters positioned to align with at least one first spout zone and at least one second spout zone on a plurality of parallel trough-shaped downcomers on an adjacent tray; the second tray comprising: a perforated deck; a plurality of parallel trough-shaped downcomers extending through the deck, each downcomer having a first spout zone and a second spout zone at a bottom; at least one perforated bubble promoter on the deck, the at least one bubble promoter having a first side and a second side, the bubble promoter positioned to align with the first spout zone and the second spout zone on a plurality of parallel trough-shaped downcomers on an adjacent tray; a half bubble promoter on an edge of the second tray; wherein a ratio of an open area of a first spout zone to an open area of a second spout zone on a tray adjacent to the first tray is 0.95 to 1.05 times a ratio of an average of the open area of a first contacting zone of the deck of the first tray and a first contacting zone of the deck of the second tray to an average of a second contacting zone of the deck of the first tray and a second contacting zone of the deck of the second tray; and wherein the first contacting zone of the first tray is defined by one side of the bubble promoter and an associated deck zone, the first contacting zone of the second tray is defined by one side of the bubble promoter or the half bubble promoter and an associated deck zone, the second contacting zone of the first tray is defined by one side of the bubble promoter and an associated deck zone, and the second contacting zone of the second tray is defined by one side of the bubble promoter or the half bubble promoter and an associated deck zone.

The associated deck zone depends on the location of the bubble promoter and which tray is involved. Each of the associated deck zones is extended either from the edge of one side of the bubble promoter or the edge of the half bubble promoter to a downcomer in width and from one edge of the tray to the other edge in length.

In some embodiments, there are downcomers on the edge of both sides of the first tray.

In some embodiments, there are half bubble promoters on the edge of both sides of the second tray.

In some embodiments, the bubble promoters have an inverted V-shape with vertical ends.

In some embodiments, a length of the spout zones on the first tray is less than a length of the bubble promoters on the tray below, or a width of the spout zones on the first tray is less than a width of the bubble promoters on the tray below, or both.

In some embodiments, a size of the perforations of the deck is different from a size of the perforations of the bubble promoters.

In some embodiments, a pitch of the perforations of the deck is different from a pitch of the perforations of the bubble promoters.

In some embodiments, a size of the perforations of the first spout zone deck is different from a size of the perforations of the second spout zone.

In some embodiments, a shape of the perforations of the first spout zone is different from a shape of the perforations of the second spout zone.

In some embodiments, an open area of the deck is in a range of 5 to 30% of a total area of the deck, or wherein an open area of one of the bubble promoters is in a range of 5 to 30% of a total area of the one bubble promoter, or both.

Another aspect of the invention is a mass transfer column. In one embodiment, the mass transfer column comprises: at least two trays vertically spaced apart, each tray comprising: a plurality of parallel trough-shaped downcomers extending through the deck, each downcomer having at least one first spout zone on a first side of a bottom and at least one second spout zone on a second side of the bottom; a plurality of perforated bubble promoters on the deck, each bubble promoter having a first side and a second side, the bubble promoters of one tray positioned to align with at least one first spout zone and at least one second spout zone on a plurality of parallel trough-shaped downcomers on an adjacent tray rotated 90 degrees; an open area of the at least one first spout zone on the first tray being proportional to an open area of a first contacting zone on the second tray, the first contacting zone defined by the first side of the bubble promoter and an associated deck zone; an open area of the at least one second spout zone on the first tray being proportional to an open area of a second contacting zone of the second tray, the second contacting zone defined by the second side of the bubble promoter and an associated deck zone; and wherein a ratio of the open area of the first spout zone to the open area of the second spout zone of the first tray is 0.95 to 1.05 times a ratio of the open area of the first contacting zone to the open area of the second contacting zone of the second tray.

In some embodiments, the bubble promoters have an inverted V-shape.

Figure 2A:
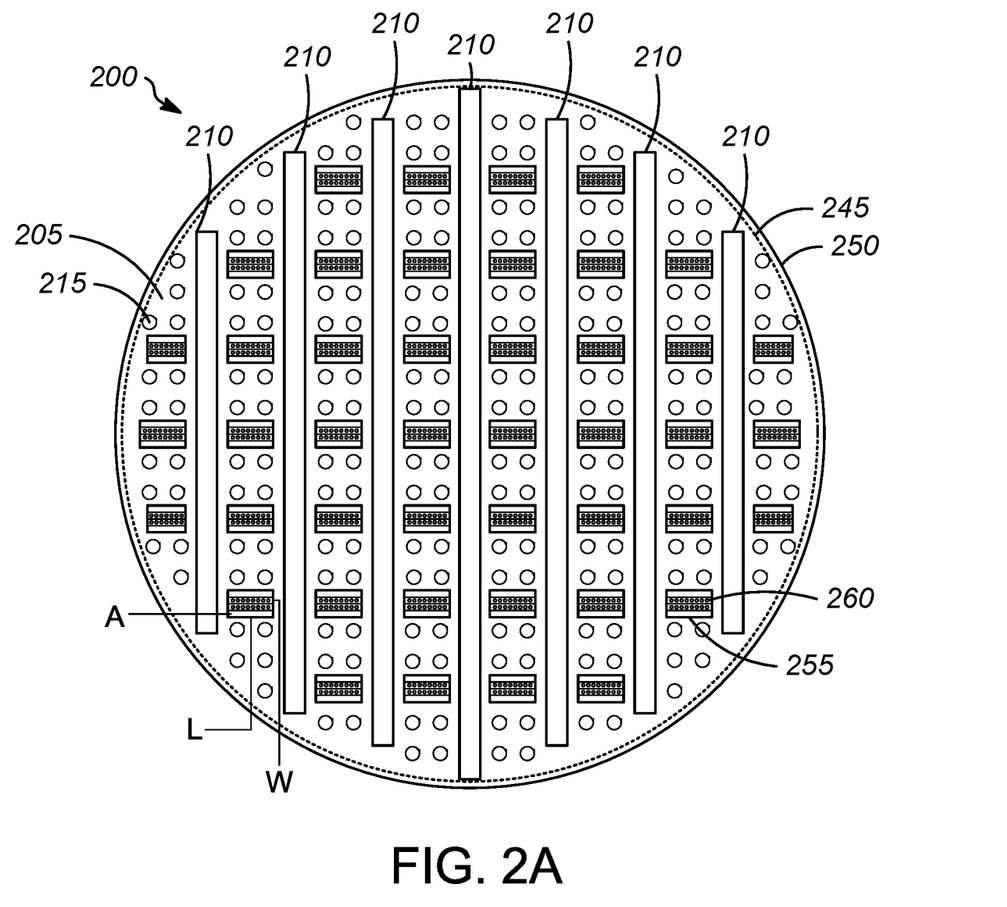
FIGS. 2A and 2B illustrate one embodiment of the multiple downcomer tray of the present invention.
Figure 2B:
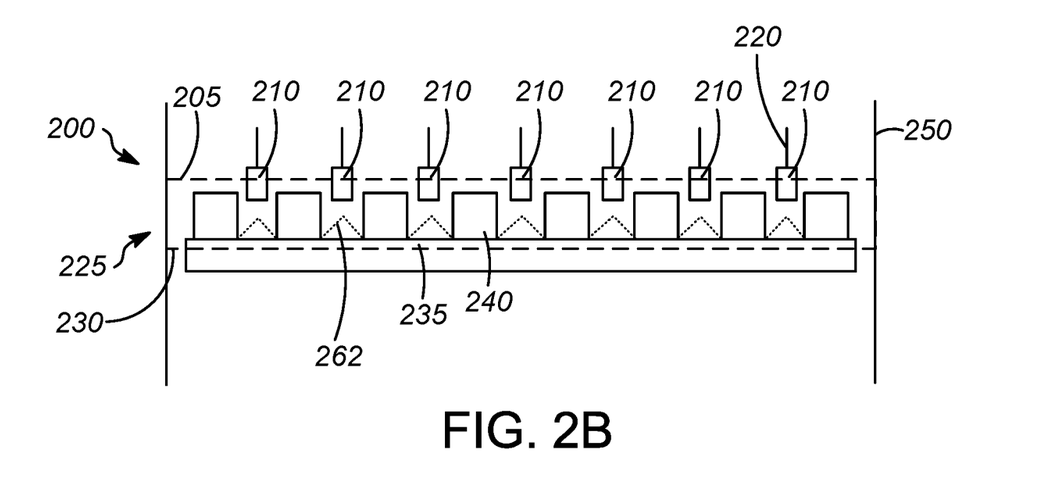

FIGS. 2A-2B show one embodiment of the multiple downcomer tray 200 of the present invention. It is composed of deck 205 and terminated downcomers 210. The deck 205 has perforations 215. There is an array of bubble promoters 260 on the deck 205 (discussed in more detail below) which are aligned with the downcomers of the tray above (not shown for tray 200 in FIG. 2B). Downcomers 210 extend across the column cross section and are supported on ring 245. The ring 245 is attached to column wall 250. There are anti jumping baffles 220 above the downcomers 210 for tray 200 (not shown in FIG. 2A). Tray 225 has a perforated deck 230 with downcomers 235 and anti jumping baffles 240. Part of the anti-jumping baffle 240 was not shown for clarity. The downcomers 235 for tray 225 are offset by 90 degrees from the downcomers 210 of tray 200. There are bubble promoters 262 on the deck 230.

Figure 3A:
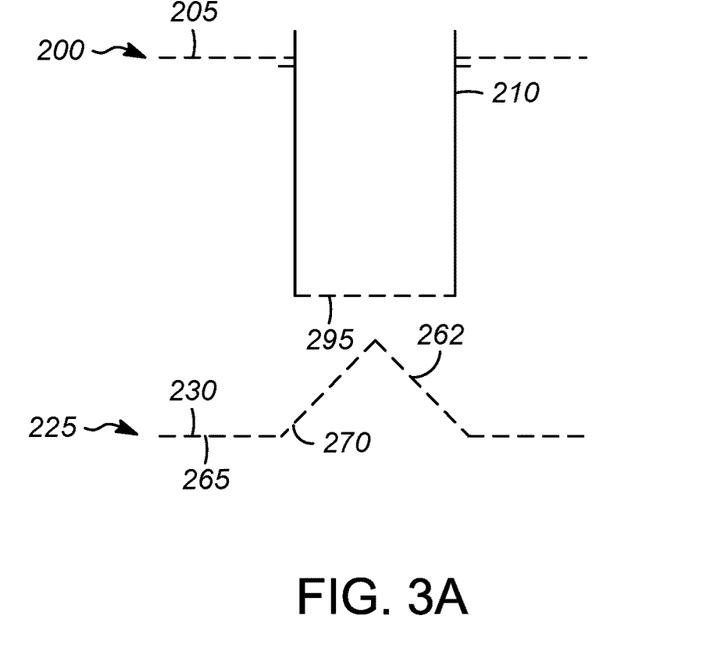
FIGS. 3A and 3B illustrate embodiments of the relationship between the downcomer of one tray and the bubble promoter of the adjacent tray.
Figure 3B:
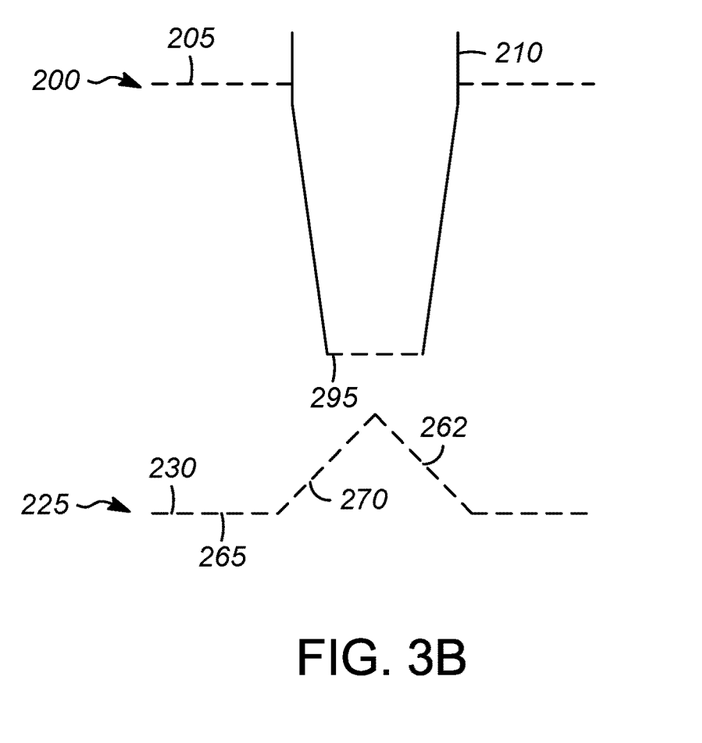
Figure 4:
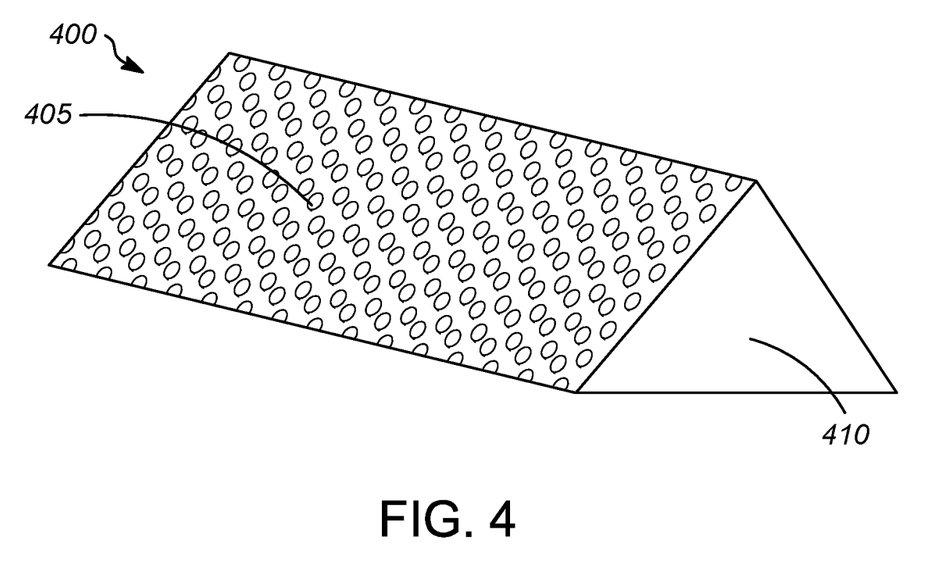
FIG. 4 illustrates one embodiment of the bubble promoter of the present invention.

The bubble promoters 262 are shown in more detail in FIGS. 3-4. FIG. 3A illustrates one embodiment of a portion of multiple downcomer trays 200 and 225. There is a downcomer 210 extending across the column cross section through deck 205 of tray 200. In this embodiment, the sides of the downcomer 210 are vertical.

The deck 230 of tray 225 has perforations 265. There is a bubble promoter 262 which has perforations 270. As shown in FIG. 3A, the bubble promoter 262 has an inverted V-shape. The bottom 295 of downcomer 210 is partially open to allow liquid to flow down onto bubble promoter 262.

FIG. 3B illustrates another embodiment of a portion of the multiple downcomer trays 200 and 225. In this embodiment, the sides of the downcomer 210 below deck 205 are sloped. The sloped sides can be either straight (as shown) or the sides can be curved.

FIG. 4 shows a bubble promoter 400 with perforated, sloped sides 405 and non-perforated vertical ends 410 forming an inverted V-shape (i.e., a tent shape). The two opposite non-perforated vertical ends 410 are parallel for most of the bubble promoters in middle of the tray but can be non-parallel for some of those adjacent to column wall 250. Bubble promoters with perforated trapezoidal sides or other shapes may also be used.

Returning to FIGS. 2A-2B, each bubble promoter 260 defines an area A (the length L and width W of the bubble promoter 260) on the deck 205 underneath the bubble promoter 260. The defined area A on the deck 205 has an opening. The opening can be a single hole or plurality of holes. In some embodiments, the total open area of the defined area A is greater than or equal to 100% of the total open area of the bubble promoter for that defined area. Preferably, the total open area of the defined area A is greater than or equal to 120% of the total open area of the bubble promoter for that defined area.

The perforations 215 in the deck 205 and the perforations 270 in the bubble promoter 262 can have the same size or different sizes, the same shape or different shapes, and the same pitch (number of perforations/area) or different pitches.

Figure 5:
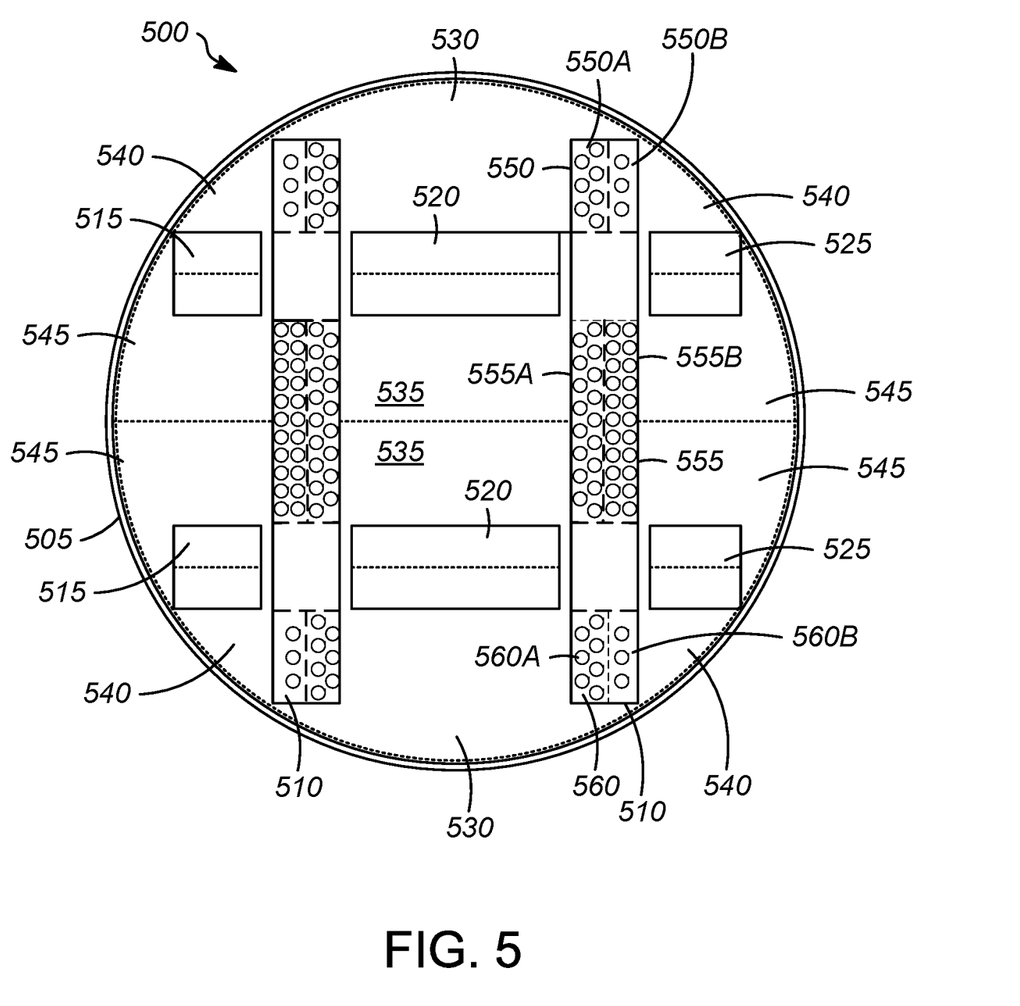
FIG. 5 illustrates one embodiment of tray according to the present invention.

FIG. 5 illustrates one embodiment of a tray 500 with two downcomers. The tray 500 has a deck 505 with two downcomers 510 and bubble promoters 515, 520, 525. This divides the deck 505 into different deck zones 530, 535, 540, 545 having different areas. There are three spout groups 550, 555, 560. Each spout group 550, 555, 560 has a first zone A and a second zone B. The spout zones 550A, 550B, 555A, 555B, 560A and 560B correspond to the contacting zones of the adjacent tray.

Figure 6:
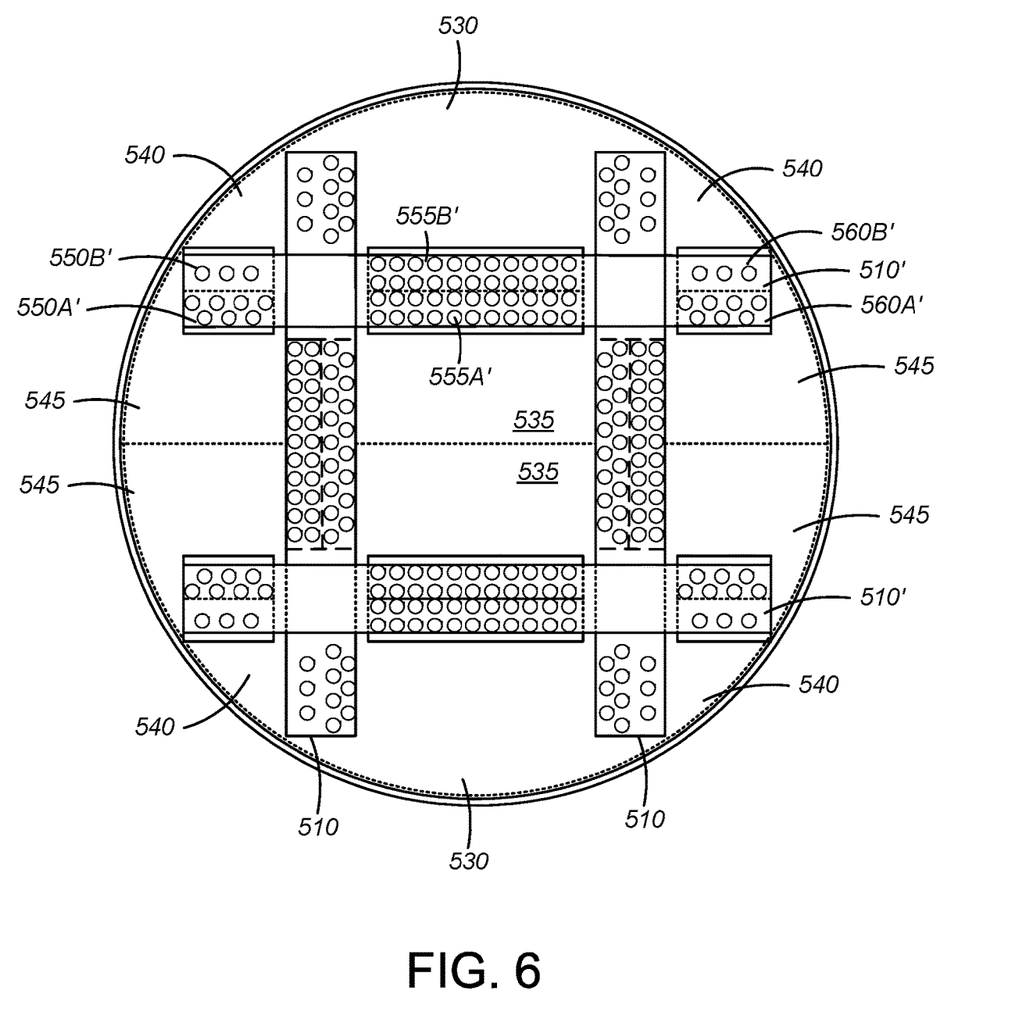
FIG. 6 illustrates the tray of FIG. 5 with the downcomers from the adjacent tray shown.

FIG. 6 illustrates tray 500 of FIG. 5 overlaid with the downcomers 510' of the adjacent tray immediately above tray 500 (the deck of the adjacent tray is not shown). The adjacent tray is rotated 90 degrees from tray 500 so that the downcomers 510' are positioned above the bubble promoters 515, 520, on tray 500. Spout zone 550A' has more open area than spout zone 550B' because the open area of half of the bubble promoter 515 and associated deck zone 545 is larger than the open area of the other half of the bubble promoter 515 and associated deck zone 540. The open area of spout zone 555B' is larger than the open area of spout zone 555A' because the open area of half of the bubble promoter 520 and associated deck zone 530 is larger than the open area of the other half of the bubble promoter 520 and associated deck zone 535. Spout zone 560A' has more open area than spout zone 560B' because the open area of half of the bubble promoter 525 and associated deck zone 545 is larger the open area of the other half of the bubble promoter 525 and associated deck zone 540. The open area of the spout zone 550A', 550B', 555A', 555B', 560A', and 560B' is proportional to the open area of the corresponding contacting zone on the adjacent tray including one side of the bubble promoter 515 and associated deck zones 545, 540, one side of bubble promoter 520 and associated deck zones 535, 530 and one side of bubble promoter 525 and associated deck zones 545, 540. In addition, spout group 555 is larger than spout groups 550 and 560 because the bubble promoter 520 and associated deck zones 530 and 535 are larger than bubble promoter 515 and associated deck zones 540 and 545 and bubble promoter 525 and associated deck zone 540 and 545.

Liquid from spout zone 550A' is distributed to the contacting zone of half of bubble promoter 515 and associated deck zone 545. Liquid from spout zone 550B' is distributed to the other half of bubble promoter 515 and associated deck zone 540. Liquid from spout zone 555A' is distributed to half of bubble promoter 520 and associated deck zone 535. Liquid from spout zone 555B' is distributed to the other half of bubble promoter 520 and associated deck zone 530. Liquid from spout zone 560A' is distributed to half of bubble promoter 525 and associated deck zone 545. Liquid from spout zone 560B' is distributed to the other half of bubble promoter 525 and associated deck zone 540.

The ratio of the open area of perforations on a contacting zone including half of the bubble promoter and the associated deck zone to the open area of a respective spout zone of the downcomers on the adjacent tray is essentially the same across the entire tray.

Figure 7A:
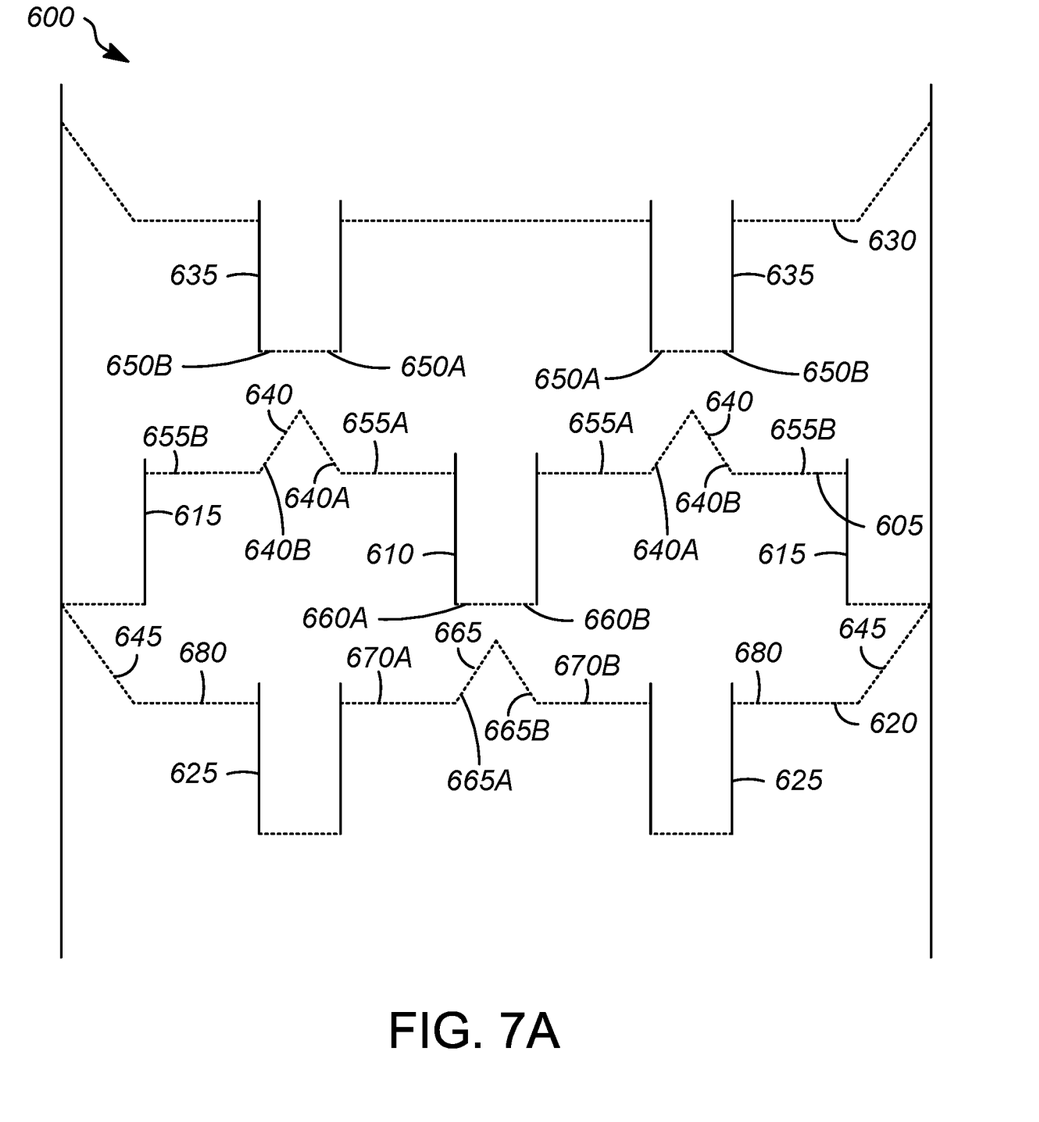
FIGS. 7A-B illustrate a multiple pass tray according to the present invention.
Figure 7B:
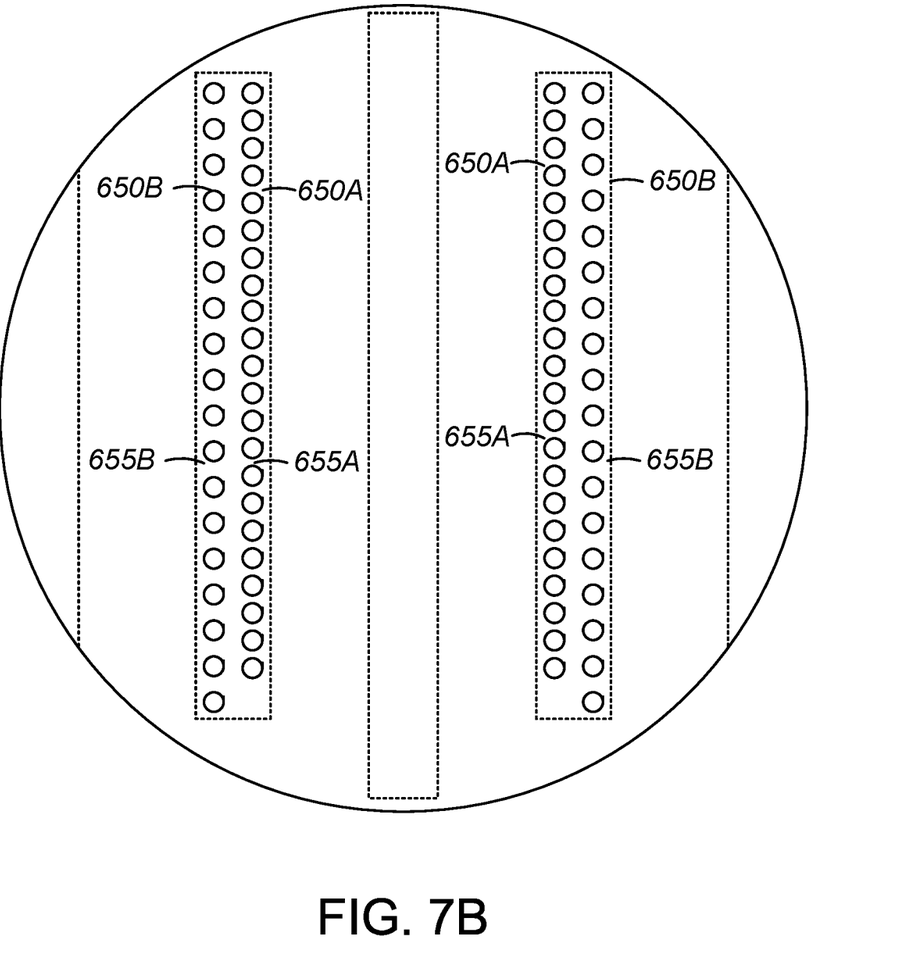

FIGS. 7A-B illustrates multiple pass tray arrangement 600 with parallel downcomers. As shown, tray 605 has one center downcomer 610 and two end downcomers 615. Tray 620 has two middle downcomers 625. Tray 630 has two middle downcomers 635 and has the same design as tray 620.

Spouts are distributed along the length of the downcomers for fluid distribution to a lower tray. The length of the bubble promoters on a lower tray is the same as or slightly longer than the length of the downcomer spout zone.

Full tent bubble promoters 640 are located under the middle downcomers 635 of tray 630 and bubble promoter 665 under center downcomer 610 of tray 605. Half bubble promoters 645 are located under end downcomers 615.

Middle downcomers 635 have first and second spout zones 650A and 650B. Liquid from middle downcomers 635 is distributed through first spout zone 650A to first contacting zone comprising one side 640A of bubble promoter 640 and associated deck zone 655A and through second spout zone 650B to second contacting zone comprising one side 640B of bubble promoter 640 and associated deck zone 655B.

Liquid from center downcomer 610 is distributed through first and second spout zones 660A and 660B to full tent bubble promoter 665. First contacting zone comprise one side 665A of bubble promoter 665 and associated deck zone 670A, and second contacting zone comprise the other side 665B of bubble promoter 665 and associated deck zone 670B.

Liquid from each of the end downcomers 615 is distributed through a bottom spout zone to half bubble promoter 645 and associated deck zone 680.

The targeted ratio of the open areas of a contacting zone including one side of a bubble promoter or a half bubble promoter and associated deck zone to a respective spout zone on the bottom of a downcomer above is essentially the same across the tray. For example, the ratio of open area of the contacting zone including one side of bubble promoter 640A and associated deck zone 655A to open area of the spout zone 650A is 0.95 to 1.05 times the ratio of open area of the contacting zone including one side of bubble promoter 640B and associated deck zone 655B to open area of the spout zone 650B. When the open areas of contacting zones vertically aligned on adjacent trays are different, the average open area of the two contacting zones may be used for determining the open area of the spout zone above the two trays. For example, the open area of one side of bubble promoter 640B and associated deck zone 655B on the first tray may be different from the open area of the half bubble promoter 645 and associated deck zone 680 on the second tray, the average of the open areas of the two contacting zones may be used for determining the open area of spout zone 650B.

FIGS. 7A-B illustrates one of the multiple pass tray arrangements. The same design method on the ratio of open area of downcomer spout zones to the open area of adjacent tray contacting zones can be applied to other multiple pass tray arrangements with "n" downcomers on one tray and "n+1" downcomers on the adjacent tray where n=1, 2 (as shown in FIGS. 7A-B), 3, etc.

The same design method on the ratio of open area of downcomer spout zones to the open area of adjacent tray contacting zones can be applied to any other trays with terminated downcomers and bubble promoters under the downcomers on an adjacent tray.

Specific Embodiments

While the following is described in conjunction with specific embodiments, it will be understood that this description is intended to illustrate and not limit the scope of the preceding description and the appended claims.

A first embodiment of the invention is a tray comprising a perforated deck; a plurality of parallel trough-shaped downcomers extending through the deck, each downcomer having at least one first spout zone on a first side of a bottom and at least one second spout zone on a second side of the bottom; a plurality of perforated bubble promoters on the deck, each bubble promoter having a first side and a second side, the bubble promoters positioned to align with at least one first spout zone and at least one second spout zone on a plurality of parallel trough-shaped downcomers on an adjacent tray rotated 90 degrees from the tray; an open area of the at least one first spout zone on the adjacent tray being proportional to an open area of a first contacting zone of the tray, the first contacting zone defined by the first side of the bubble promoter and an associated deck zone; an open area of the at least one second spout zone on the adjacent tray being proportional to an open area of a second contacting zone of the tray, the second contacting zone defined by the second side of the bubble promoter and an associated deck zone; and wherein a ratio of the open area of the first spout zone to the open area of the second spout zone of the adjacent tray is 0.95 to 1.05 times a ratio of the open area of the first contacting zone to the open area of the second contacting zone of the tray An embodiment of the invention is one, any or all of prior embodiments in this paragraph up through the first embodiment in this paragraph wherein the bubble promoters have an inverted V-shape with vertical ends. An embodiment of the invention is one, any or all of prior embodiments in this paragraph up through the first embodiment in this paragraph wherein a length of the spout zones on the first tray is less than a length of the bubble promoters on the tray below, or a width of the spout zones on the first tray is less than a width of the bubble promoters on the tray below, or both. An embodiment of the invention is one, any or all of prior embodiments in this paragraph up through the first embodiment in this paragraph wherein a size of the perforations of the deck is different from a size of the perforations of the bubble promoters. An embodiment of the invention is one, any or all of prior embodiments in this paragraph up through the first embodiment in this paragraph wherein a pitch of the perforations of the deck is different from a pitch of the perforations of the bubble promoters. An embodiment of the invention is one, any or all of prior embodiments in this paragraph up through the first embodiment in this paragraph wherein a size of the perforations of the first spout zone is different from a size of the perforations of the second spout zone. An embodiment of the invention is one, any or all of prior embodiments in this paragraph up through the first embodiment in this paragraph wherein a shape of the perforations of the first spout zone is different from a shape of the perforations of the second spout zone. An embodiment of the invention is one, any or all of prior embodiments in this paragraph up through the first embodiment in this paragraph wherein an open area of the deck is in a range of 5 to 30% of a total area of the deck, or wherein an open area of one of the bubble promoters is in a range of 5 to 30% of a total area of the one bubble promoter, or both.

A second embodiment of the invention is a pair of trays comprising the first tray comprising a perforated deck; a plurality of parallel trough-shaped downcomers extending through the deck, each downcomer having a first spout zone on a first side of a bottom and a second spout zone on a second side of the bottom, and wherein there is a downcomer at an edge of the first tray; a plurality of perforated bubble promoters on the deck, each bubble promoter having a first side and a second side, the bubble promoters positioned to align with at least one first spout zone and at least one second spout zone on a plurality of parallel trough-shaped downcomers on an adjacent tray; the second tray comprising a perforated deck; a plurality of parallel trough-shaped downcomers extending through the deck, each downcomer having a first spout zone and a second spout zone at a bottom; at least one perforated bubble promoter on the deck, the at least one bubble promoter having a first side and a second side, the bubble promoter positioned to align with the first spout zone and the second spout zone on a plurality of parallel trough-shaped downcomers on an adjacent tray; a half bubble promoter on an edge of the second tray; wherein a ratio of an open area of a first spout zone to an open area of a second spout zone on a tray adjacent to the first tray is 0.95 to 1.05 times a ratio of the open area of the first contacting zone to the second contacting zone of the first tray or an average of the open area of a first contacting zone of the first tray and a first contacting zone of the second tray to an average of a second contacting zone of the first tray and a second contacting zone of the second tray; and wherein the first contacting zone of the first tray is defined by one side of the bubble promoter and an associated deck zone, the first contacting zone of the second tray is defined by one side of the bubble promoter or the half bubble promoter and an associated deck zone, the second contacting zone of the first tray is defined by one side of the bubble promoter and an associated deck zone, and the second contacting zone of the second tray is defined by one side of the bubble promoter or the half bubble promoter and an associated deck zone. An embodiment of the invention is one, any or all of prior embodiments in this paragraph up through the second embodiment in this paragraph wherein there are downcomers on the edge of both sides of the first tray. An embodiment of the invention is one, any or all of prior embodiments in this paragraph up through the second embodiment in this paragraph wherein there are half bubble promoters on the edge of both sides of the second tray. An embodiment of the invention is one, any or all of prior embodiments in this paragraph up through the second embodiment in this paragraph wherein the bubble promoters have an inverted V-shape with vertical ends. An embodiment of the invention is one, any or all of prior embodiments in this paragraph up through the second embodiment in this paragraph wherein a length of the spout zones on the first tray is less than a length of the bubble promoters on the tray below, or a width of the spout zones on the first tray is less than a width of the bubble promoters on the tray below, or both. An embodiment of the invention is one, any or all of prior embodiments in this paragraph up through the second embodiment in this paragraph wherein a size of the perforations of the deck is different from a size of the perforations of the bubble promoters. An embodiment of the invention is one, any or all of prior embodiments in this paragraph up through the second embodiment in this paragraph wherein a pitch of the perforations of the deck is different from a pitch of the perforations of the bubble promoters. An embodiment of the invention is one, any or all of prior embodiments in this paragraph up through the second embodiment in this paragraph wherein a size of the perforations of the first spout zone deck is different from a size of the perforations of the second spout zone. An embodiment of the invention is one, any or all of prior embodiments in this paragraph up through the second embodiment in this paragraph wherein a shape of the perforations of the first spout zone is different from a shape of the perforations of the second spout zone. An embodiment of the invention is one, any or all of prior embodiments in this paragraph up through the second embodiment in this paragraph wherein an open area of the deck is in a range of 5 to 30% of a total area of the deck, or wherein an open area of one of the bubble promoters is in a range of 5 to 30% of a total area of the one bubble promoter, or both.

A third embodiment of the invention is a mass transfer column comprising at least two trays vertically spaced apart, each tray comprising a plurality of parallel trough-shaped downcomers extending through the deck, each downcomer having at least one first spout zone on a first side of a bottom and at least one second spout zone on a second side of the bottom; a plurality of perforated bubble promoters on the deck, each bubble promoter having a first side and a second side, the bubble promoters of one tray positioned to align with at least one first spout zone and at least one second spout zone on a plurality of parallel trough-shaped downcomers on an adjacent tray rotated 90 degrees; an open area of the at least one first spout zone on the first tray being proportional to an open area of a first contacting zone on the second tray, the first contacting zone defined by the first side of the bubble promoter and an associated deck zone; an open area of the at least one second spout zone on the first tray being proportional to an open area of a second contacting zone of the second tray, the second contacting zone defined by the second side of the bubble promoter and an associated deck zone; and wherein a ratio of the open area of the first spout zone to the open area of the second spout zone of the first tray is 0.95 to 1.05 times a ratio of the open area of the first contacting zone to the open area of the second contacting zone of the second tray. An embodiment of the invention is one, any or all of prior embodiments in this paragraph up through the third embodiment in this paragraph wherein the bubble promoters have an inverted V-shape.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:
1. A tray comprising:
a perforated deck;
a plurality of parallel trough-shaped downcomers extending through the deck, each downcomer having at least one first spout zone on a first side of a bottom and at least one second spout zone on a second side of the bottom;
a plurality of perforated bubble promoters on the deck, each bubble promoter having a first side and a second side, the bubble promoters positioned to align with at least one first spout zone and at least one second spout zone on a plurality of parallel trough-shaped downcomers on an adjacent tray rotated 90 degrees from the tray;
an open area of the at least one first spout zone on the adjacent tray being proportional to an open area of a first contacting zone of the tray, the first contacting zone defined by the first side of the bubble promoter and an associated deck zone;

an open area of the at least one second spout zone on the adjacent tray being proportional to an open area of a second contacting zone of the tray, the second contacting zone defined by the second side of the bubble promoter and an associated deck zone; and wherein a ratio of the open area of the first spout zone to the open area of the second spout zone of the adjacent tray is 0.95 to 1.05 times a ratio of the open area of the first contacting zone to the open area of the second contacting zone of the tray.

2. The tray of claim 1 wherein the bubble promoters have an inverted V-shape with vertical ends.

3. The tray of claim 1 wherein a length of the spout zones on the first tray is less than a length of the bubble promoters on the tray below, or a width of the spout zones on the first tray is less than a width of the bubble promoters on the tray below, or both.

4. The tray of claim 1 wherein a size of the perforations of the deck is different from a size of the perforations of the bubble promoters.

5. The tray of claim 1 wherein a pitch of the perforations of the deck is different from a pitch of the perforations of the bubble promoters.

6. The tray of claim 1 wherein a size of the perforations of the first spout zone is different from a size of the perforations of the second spout zone.

7. The tray of claim 1 wherein a shape of the perforations of the first spout zone is different from a shape of the perforations of the second spout zone.

8. The tray of claim 1 wherein an open area of the deck is in a range of 5 to 30% of a total area of the deck, or wherein an open area of one of the bubble promoters is in a range of 5 to 30% of a total area of the one bubble promoter, or both.

9. A pair of trays comprising:
the first tray comprising:
a perforated deck;
a plurality of parallel trough-shaped downcomers extending through the deck, each downcomer having a first spout zone on a first side of a bottom and a second spout zone on a second side of the bottom, and wherein there is a downcomer at an edge of the first tray;
a plurality of perforated bubble promoters on the deck, each bubble promoter having a first side and a second side, the bubble promoters positioned to align with at least one first spout zone and at least one second spout zone on a plurality of parallel trough-shaped downcomers on an adjacent tray;
the second tray comprising:
a perforated deck;
a plurality of parallel trough-shaped downcomers extending through the deck, each downcomer having a first spout zone and a second spout zone at a bottom;
at least one perforated bubble promoter on the deck, the at least one bubble promoter having a first side and a second side, the bubble promoter positioned to align with the first spout zone and the second spout zone on a plurality of parallel trough-shaped downcomers on an adjacent tray;
a half bubble promoter on an edge of the second tray;
wherein a ratio of an open area of a first spout zone to an open area of a second spout zone on a tray adjacent to the first tray is 0.95 to 1.05 times a ratio of the open area of the first contacting zone to the second contacting zone of the first tray or an average of the open area of a first contacting zone of the first tray and a first contacting zone of the second tray to an average of a second contacting zone of the first tray and a second contacting zone of the second tray; and wherein the first contacting zone of the first tray is defined by one side of the bubble promoter and an associated deck zone, the first contacting zone of the second tray is defined by one side of the bubble promoter or the half bubble promoter and an associated deck zone, the second contacting zone of the first tray is defined by one side of the bubble promoter and an associated deck zone, and the second contacting zone of the second tray is defined by one side of the bubble promoter or the half bubble promoter and an associated deck zone.

10. The pair of trays of claim 9 wherein there are downcomers on the edge of both sides of the first tray.

11. The pair of trays of claim 9 wherein there are half bubble promoters on the edge of both sides of the second tray.

12. The pair of trays of claim 9 wherein the bubble promoters have an inverted V-shape with vertical ends.

13. The pair of trays of claim 9 wherein a length of the spout zones on the first tray is less than a length of the bubble promoters on the tray below, or a width of the spout zones on the first tray is less than a width of the bubble promoters on the tray below, or both.

14. The pair of trays of claim 9 wherein a size of the perforations of the deck is different from a size of the perforations of the bubble promoters.

15. The pair of trays of claim 9 wherein a pitch of the perforations of the deck is different from a pitch of the perforations of the bubble promoters.

16. The pair of trays of claim 9 wherein a size of the perforations of the first spout zone deck is different from a size of the perforations of the second spout zone.

17. The pair of trays of claim 9 wherein a shape of the perforations of the first spout zone is different from a shape of the perforations of the second spout zone.

18. The pair of trays of claim 9 wherein an open area of the deck is in a range of 5 to 30% of a total area of the deck, or wherein an open area of one of the bubble promoters is in a range of 5 to 30% of a total area of the one bubble promoter, or both.

19. A mass transfer column comprising:
at least two trays vertically spaced apart, each tray comprising:
a plurality of parallel trough-shaped downcomers extending through the deck, each downcomer having at least one first spout zone on a first side of a bottom and at least one second spout zone on a second side of the bottom;
a plurality of perforated bubble promoters on the deck, each bubble promoter having a first side and a second side, the bubble promoters of one tray positioned to align with at least one first spout zone and at least one second spout zone on a plurality of parallel trough-shaped downcomers on an adjacent tray rotated 90 degrees;
an open area of the at least one first spout zone on the first tray being proportional to an open area of a first contacting zone on the second tray, the first contacting zone defined by the first side of the bubble promoter and an associated deck zone;
an open area of the at least one second spout zone on the first tray being proportional to an open area of a second contacting zone of the second tray, the second contacting zone defined by the second side of the bubble promoter and an associated deck zone; and wherein a ratio of the open area of the first spout zone to the open area of the second spout zone of the first tray is 0.95 to 1.05 times a ratio of the open area of the first contacting zone to the open area of the second contacting zone of the second tray.

20. The column of claim 19 wherein the bubble promoters have an inverted V-shape.

* * * * *